United States Patent
Flemming et al.

(10) Patent No.: US 11,338,332 B2
(45) Date of Patent: May 24, 2022

(54) CLEANING STATION FOR OPTICAL ELEMENTS

(71) Applicant: SATISLOH AG, Baar (CH)

(72) Inventors: Marcel Flemming, Bäretswil (CH); Marc Peter, Zürich (CH)

(73) Assignee: SATISLOH AG, Baar (CH)

( * ) Notice: Subject to any disclaimer, the term of this patent is extended or adjusted under 35 U.S.C. 154(b) by 0 days.

(21) Appl. No.: 16/761,597

(22) PCT Filed: Nov. 5, 2018

(86) PCT No.: PCT/EP2018/080201
§ 371 (c)(1),
(2) Date: May 5, 2020

(87) PCT Pub. No.: WO2019/091925
PCT Pub. Date: May 16, 2019

(65) Prior Publication Data
US 2020/0269287 A1    Aug. 27, 2020

(30) Foreign Application Priority Data
Nov. 7, 2017  (EP) .................................... 17200354

(51) Int. Cl.
*B08B 3/02* (2006.01)
*B29D 11/00* (2006.01)
*G02C 13/00* (2006.01)

(52) U.S. Cl.
CPC ........ *B08B 3/024* (2013.01); *B29D 11/00942* (2013.01); *G02C 13/006* (2013.01); *B08B 2203/007* (2013.01)

(58) Field of Classification Search
CPC ................ G02C 13/006; G02C 13/008; F04B 2201/0207; F04B 2201/02071
See application file for complete search history.

(56) References Cited

U.S. PATENT DOCUMENTS 5,794,635 A * 8/1998 Maines ................ G02C 13/006
134/155
2006/0081269 A1  4/2006 Kim et al.
(Continued)

FOREIGN PATENT DOCUMENTS

DE  10 2007 060 467 A1  6/2009
JP       2003-19467 A   1/2003

OTHER PUBLICATIONS

International Search Report dated Feb. 1, 2019 in PCT/EP2018/080201 filed on Nov. 5, 2018.

*Primary Examiner* — Mikhail Kornakov
*Assistant Examiner* — Ryan L Coleman
(74) *Attorney, Agent, or Firm* — Oblon, McClelland, Maier & Neustadt, L.L.P.

(57) ABSTRACT

A cleaning station for an optical element is providing, including: an optical element holder configured to hold the optical element; a first drive configured to rotate the optical element holder around a rotation axis coinciding with an optical axis of the optical element when held by the optical element holder; a cleaning nozzle configured to project a cleaning jet of a cleaning liquid towards the optical element; and a separate drying nozzle configured to project a drying jet towards the optical element, the cleaning nozzle and the drying nozzle being configured to move in order to direct the cleaning jet and the drying jet, respectively, successively to different locations on the optical element.

11 Claims, 4 Drawing Sheets

(56) References Cited

U.S. PATENT DOCUMENTS

| | | |
|---|---|---|
| 2008/0308131 A1 | 12/2008 | Kim et al. |
| 2009/0029061 A1* | 1/2009 | Shinde ............. B29D 11/00884 427/508 |
| 2012/0006361 A1 | 1/2012 | Miyagi et al. |
| 2012/0111372 A1* | 5/2012 | Hesterberg .......... A47L 15/0049 134/25.2 |
| 2014/0090673 A1* | 4/2014 | Atsumi .................... B08B 3/02 134/153 |
| 2015/0303078 A1 | 10/2015 | Ishibashi |
| 2017/0100025 A1* | 4/2017 | Lengsfeld ................. A61L 2/18 |
| 2017/0218943 A1* | 8/2017 | Ellis ........................ F04B 49/06 |

\* cited by examiner

CLEANING STATION FOR OPTICAL ELEMENTS

FIELD OF THE INVENTION

The invention relates to a cleaning station for optical elements, in particular for cleaning such optical elements before hard coating and after a polishing operation.

BACKGROUND AND PRIOR ART

EP 2 138 271 in the name of the present applicant discloses an example of a process for manufacturing spectacles lenses according to a prescription.

An ophthalmic lens blank generally has a first face with a predetermined curvature and a second face, opposite the first face on which a desired surface contour is generated by a machining process. The overall process is generally referred to as "lens surfacing", in particular polishing, grinding or fine grinding and the overall object is to yield a finished spectacle lens L so that the curvature of the first (in this instance convex) face cx and the curvature of the machined second (in this instance concave) face cc cooperate to yield desired optical properties according to the prescription.

In addition to this, the first and/or second faces cx, cc of the lens L are usually coated to provide the finished spectacle lens L with an enhanced ability to resist scratching (by means of a "hard coating" HC), with a low residual reflection and a desired color (by means of an "antireflection coating" AR), and/or with certain surface properties such as hydrophobic, oleophobic and dust repelling properties (by means of a "top coating" TC).

"Polishing", i.e. fine machining of a blocked spectacle lens blank SFB to give the second face cc the required microgeometry, is described, e.g., in documents EP-A-1 473 116 and EP-A-1 698 432.

Depending on inter alia the material of the spectacle lenses L, the fine machining process is divided into a fine grinding operation and a subsequent polishing operation, or includes only a polishing operation if a polishable second face cc has already been produced during the generating stage.

Before applying a coating, in particular a hard coat, the polished lens face must be cleaned very thoroughly to eliminate all residuals from the polishing steps. Indeed, in case that polishing particles or dust particles are still present, the hard coat may be altered or even present defects or loss of adhesion.

DE102007060467 discloses a device for cleaning a lens having a driving device for a rotary drive of an optical eyeglass lens and with a spraying nozzle for spraying aerosol on the optical lens.

The spraying nozzle has a valve for supplying water and another valve for supplying air as carrier for water. The spraying nozzle directs the aerosol in a jet towards the optical lens.

Although this cleaning device seems to be quite efficient, its functioning might be improved, in particular to get an even better cleaned surface quality before a further coating step and to reduce the duration of the cleaning step.

Some cleaning devices are also known from semiconductor wafer industry. However, such examples are difficult to transpose as optical elements do not have a standardized shape and in particular thickness and curvature as semiconductor wafers have.

The present invention proposes an improved cleaning station for polished optical elements.

To this extent, the present invention proposes a cleaning station for an optical element comprising
- an optical element holder for holding the optical element,
- a first drive for rotating the optical element holder around a rotation axis, the rotation axis coinciding with the optical axis of the optical element when held by the optical element holder,
- a cleaning nozzle configured to project a cleaning jet of a cleaning liquid towards the optical element,
- wherein the cleaning station further comprises a separate drying nozzle configured to project a drying jet towards the optical element,
- and the cleaning nozzle and the drying nozzle are configured to move in order to direct respectively the cleaning jet/the drying jet successively to different locations on the optical element.

Thanks to the cleaning station according to the invention, the cleaning jet impacts successively the entire surface of the optical element allowing thus a more efficient cleaning. In addition, the necessary drying is also very quick and efficient.

The cleaning station according to the invention may comprise one or several of the following features taken alone or in combination:

According to one aspect, the cleaning nozzle and the drying nozzle are mounted on a second drive of the cleaning station for moving said cleaning nozzle and drying nozzle.

The second drive comprises for example a swiveling axis orientated perpendicular to the rotation axis of the optical element holder and configured to apply a swivel movement to the cleaning nozzle and the drying nozzle.

According to an alternative development, the second drive is configured to apply a translational movement to the cleaning nozzle and the drying nozzle that is perpendicular to the rotation axis of the optical element holder.

The cleaning station may further comprise a cleaning chamber housing the optical element holder, the cleaning nozzle and the drying nozzle, and connected to a suction pipe.

According to a further aspect, the cleaning liquid comprises deionized water, in particular completed with a lens drying additive.

The cleaning station may further comprise a heater for heating the deionized water, in particular to a temperature comprised between 30° C. and 40° C., for example 35° C.

According to another aspect the cleaning station comprises for example a pump unit for delivering a high pressure cleaning liquid to the cleaning nozzle, the pressure of the cleaning liquid being comprised between 150-200 bars, in particular 180 bars.

The pump unit can comprise a piston operated pump unit having in particular a stroke number monitoring unit.

The drying nozzle may be coupled, in particular attached or fixed to the cleaning nozzle and pointing in a direction parallel to the cleaning nozzle.

Furthermore, the second drive can be configured to limit the impact of the cleaning jet and the drying jet to be located on the optical element.

The invention also concerns a method for cleaning an optical element comprising the following steps:
- rotating the optical element around its optical axis,
- projecting a cleaning jet of a cleaning liquid towards the optical element, the cleaning jet carrying out a movement in order that the cleaning jet impacts successively all locations on the optical element, projecting a drying jet, the drying jet carrying out a movement in order that the drying jet impacts successively all locations on the optical element.

According to one possible aspect, the movement carried out respectively by the cleaning jet and the drying jet is a swiveling or a translational movement.

According to another possible aspect, the movement of the cleaning jet and the drying jet is limited in order that the impact of the cleaning jet and the drying jet is located on the optical element.

Furthermore, in case when the cleaning chamber is connected to a suction pipe, an aspiration is applied to the suction pipe during cleaning and drying.

The cleaning jet presents for example a pressure between 150-200 bars, in particular 180 bars.

The projection of the cleaning jet may start at a position different to the center of the rotation of the optical element.

BRIEF DESCRIPTIONS OF THE DRAWINGS

Other advantages and characteristics will appear with the reading of the description of the following figures.

DETAILED DESCRIPTION

The embodiment(s) in the following description are only to be considered as examples. Although the description refers to one or several embodiments, this does not mean inevitably that every reference concerns the same embodiment, or that the characteristics apply only to a single embodiment. Simple characteristics of various embodiments can be also combined to new embodiments that are not explicitly described.

In the present description, the terms "upstream" and "downstream" are used according the following meaning: a first station for a certain processing operation of an optical element is placed upstream with respect to a second station when the optical element undergoes first the operation in the first station and then another operation in the second station.

And a first station for processing a certain processing operation of an optical element is placed downstream with respect to a second station when the optical element undergoes first the operation in the second station and then another operation in the first station.

In the figures is shown a reference triad X-Y-Z, where X and Y are two horizontal axes perpendicular to each other and Z is a vertical axis perpendicular to X and Y.

Figure 1:
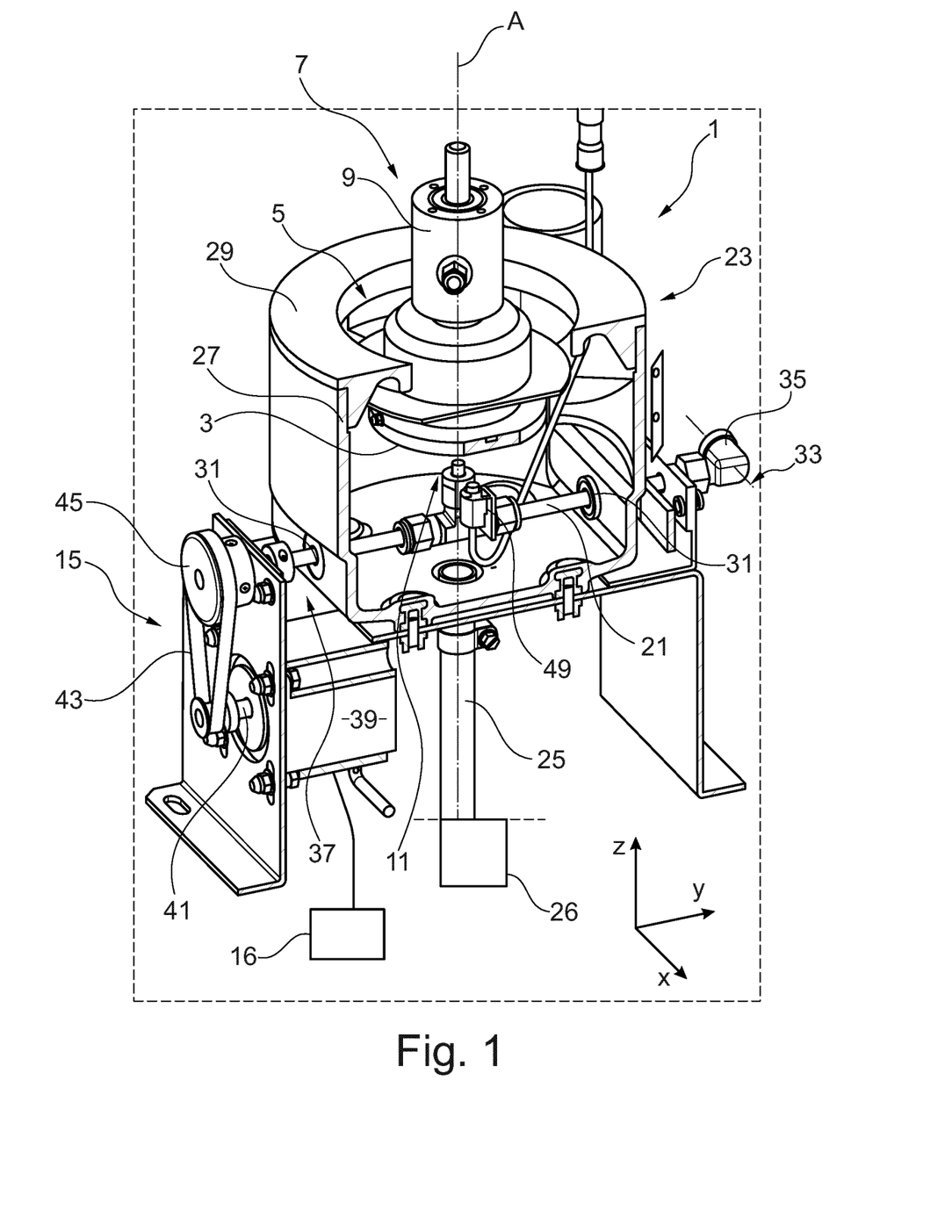
FIG. 1 is a schematic view in perspective and partially in cross section view of the cleaning station according to the invention.

In FIG. 1 is shown a cleaning station 1 for an optical element 3.

Figure 2:
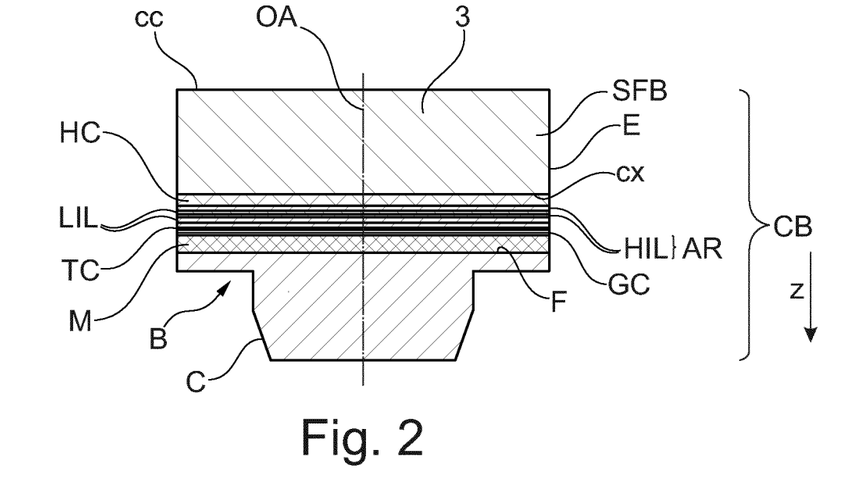
FIG. 2 is a schematic view in cross-section of an optical element fixed on a block piece.

The optical element 3 is for example a lens blank, in particular a semi-finished lens blank SFB as shown in more detail in FIG. 2 which is fixed to a block piece B.

A semi-finished lens blank SFB comprises for example a first face cx, a second face cc opposite said first face cx, and an edge E between the first face cx and the second face cc.

The first face cx possesses a final curvature (not shown in the drawing) and is already coated, starting from a substrate comprised of, e.g., mineral glass, polycarbonate, PMMA, CR 39, Trivex<®>, HI index, etc., as the case may be, with a standard hard coating HC, a standard antireflection coating AR on top of the hard coating HC, a standard top coating TC on top of the antireflection coating AR, and a special temporary grip coating GC on top of the top coating TC.

As is known per se, the antireflection coating AR comprises for example a stack of alternating antireflection layers of high index HIL and low index LIL with an outermost, in FIG. 2 lowest layer. The top coating TC is selected from a group comprising hydrophobic, oleophobic and dirt repelling coatings, as are known.

It may be foreseen a temporary grip coating GC which is made of one and the same coating material as the outermost layer of the antireflection coating AR, for example a metal oxide, in particular $SiO_2$.

The thickness of the temporary grip coating GC may range from 1 to 500 nm, preferably from 5 to 100 nm, and more preferably from 15 to 25 nm.

Further, in FIG. 2 reference sign CB designates a combination of the above semi-finished lens blank SFB and a block piece B for holding the semi-finished lens blank SFB for processing thereof, in particular for cleaning process in the cleaning station 1.

As to the structure and function of a currently preferred block piece B explicit reference is being made at this point to document EP 2 093 018 A1 of the present applicant.

Such block piece B, which can also be used in thin film coating processes under vacuum conditions, typically has a basic body made from a plastic material, with a workpiece mounting face F for attachment of the lens blank SFB with the aid of a blocking material M on one side, and a clamping portion C on the other side which is grasped by a chuck or other suitable coupling means during lens processing so as to fix the lens blank SFB blocked on the basic body of the block piece B in a machine or apparatus for processing of the lens blank SFB, and to provide in particular for reliable and secure mounting to the processing equipment throughout the whole process while avoiding damage and/or deformation to the lens blank SFB.

As far as a presently preferred blocking material M is concerned, which is applied directly onto the "temporary grip coating GC of the lens blank SFB" or to the mounting face F of the block piece B and preferably comprises an adhesive curable by UV or visible light that is liquid in an un-polymerized state, explicit reference is being made at this point to document EP 2 011 604 A1 of the present applicant.

In order to enhance the bonding effect, the workpiece mounting face F of the block piece B may be plasma treated prior to applying the blocking material M onto the workpiece mounting face F.

In the manufacturing process of an optical element 3, said cleaning station 1 may be placed downstream a machining station, for example for a grinding, fine grinding and a subsequent polishing operation of the second face cc in order to obtain the prescribed curvature for yielding the optical correction of the finished spectacles lenses and upstream a coating station, in particular for application of a hard coat, a primer or both of them, for example by spin coating. The hereby disclosed cleaning station 1 allows thorough cleaning of second face cc in order to put the face cc to be coated in the best conditions.

Returning now to FIG. 1, the cleaning station 1 comprises an optical element holder 5 for holding the optical element 3 and a first drive 7 for rotating the optical element holder 5 around a rotation axis "A", the rotation axis "A" coinciding with the optical axis "OA" of the optical element 3 when held by the optical element holder 5.

The optical element holder 5 is configured to cooperate with the clamping portion C of the block piece B. In alternative solutions where the optical element 3 is for example not mounted on a block piece B, the optical element holder 5 may be configured to cooperate directly with the optical element 3.

The first drive 7 comprises for example a not shown electrical motor. Reference 9 designates the rotational guide for a vacuum suction unit for holding the block piece B and that is coupled via a not shown magnetic coupling to the electrical motor.

In operation, the rotational speed of the optical element 3 is comprised between 1500-2500 revolutions/minute, in particular 2000 rpm.

Figure 3:
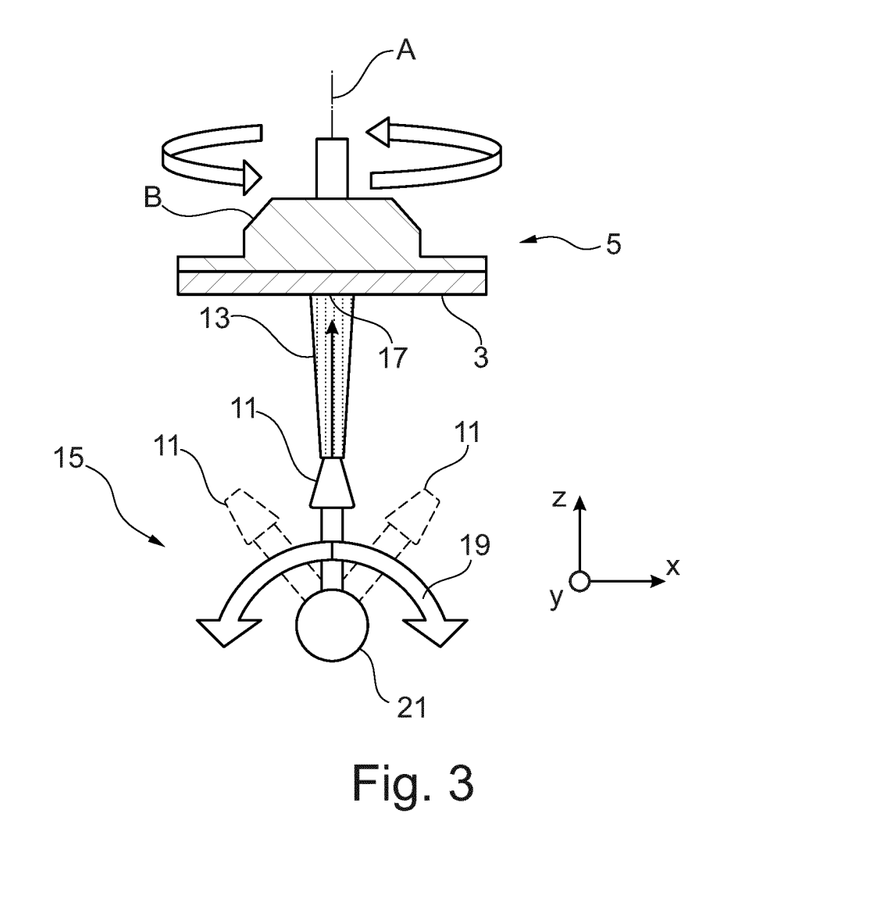
FIG. 3 is a simplified schematic representation in cross-section view of a part of the cleaning station showing in particular the cleaning nozzle.

The cleaning station 1 further comprises a cleaning nozzle 11 configured to project a cleaning jet 13 of a cleaning liquid, in particular a cleaning liquid like water towards the optical element 3 and may be disposed beneath the optical element holder 5 (FIG. 3).

Thus, the cleaning jet 13 is projected in a general upward direction along the vertical axis z.

As shown in particular in FIGS. 1 and 3, the cleaning nozzle 11 is mounted on a second drive 15 for moving the cleaning nozzle 11 in order that in particular the center 17 of the cleaning jet 13 impacts successively different locations on the optical element 3 during cleaning operation.

More specifically, the second drive 15 is connected to a controller unit 16 and is configured to apply a swivel movement (arrows 19 on FIG. 3) to the cleaning nozzle 11. Controller unit 16 comprises for example one or more processors, memories containing a specific program or software and components to communicate in a network allowing for example to receive instructions, in particular job data.

In FIG. 3, a middle position of the cleaning nozzle 11 is drawn in solid lines whereas two extremal positions of the cleaning nozzle 11 are drawn in dashed lines.

Thus, thanks to the rotational movement of the optical element holder 5 and the back and forth swiveling movement of the cleaning nozzle 11, the cleaning jet 13 impacts successively all locations on the optical element 3 during cleaning operation, developing thus the best cleaning impact. The amplitude and frequency of the swivel movement is controlled by controller unit 16. The swivel movement of the cleaning nozzle is in particular controlled in a way that it moves only to the very circumference of the optical element 3 and does not exceed its circumference. In other words, the swivel movement is depending on the individual geometry of the optical element (like the diameter) and is adjusted automatically for example according to job data related to the optical element 3. This leads to faster processing and enhanced throughput of the cleaning station 1.

Typically, projection of the cleaning liquid only starts after start of rotation of the optical element 3 and the start or zero position of the cleaning nozzle 11 is off the center of the optical element 3 in order to avoid damage due to the high pressure cleaning jet 13 which might occur because the center of the optical element 3 can be considered as nearly static.

As an example for application of a swiveling movement to the cleaning nozzle 11, the second drive 15 comprises a swiveling axis 21 orientated perpendicular to the rotation axis "A" of the optical element holder 5 and the cleaning nozzle 11 is centered with respect to the rotation axis "A" of the optical element holder 5.

Preferentially, the swiveling axis 21 might be hollow to serve at the same time as feeding pipe for the cleaning liquid.

The optical element holder 5 and the cleaning nozzle 11 are housed in a cleaning chamber 23 (FIG. 1).

In a bottom part of the cleaning chamber 23 is disposed a suction pipe 25 for aspiration or suction and evacuation of the cleaning liquid after having impacted the optical element 3 for cleaning. To this extent, an exhaust fan 26 is connected to the suction pipe 25. A constant exhaust or suction prevents defects in the hard coat caused by water droplets which can re-deposit on the surface of the optical element 3 if a foggy environment in the cleaning chamber 23 is present.

The cleaning chamber 23 comprises a bottom cylinder 27 supporting the cleaning nozzle 11 and a separable lid 29 supporting the optical element holder 5.

As can be seen on FIG. 1, the swiveling axis 21 traverses the bottom cylinder 27 and is supported by two bearings 31 mounted in the wall of the bottom cylinder 27.

Figure 4:
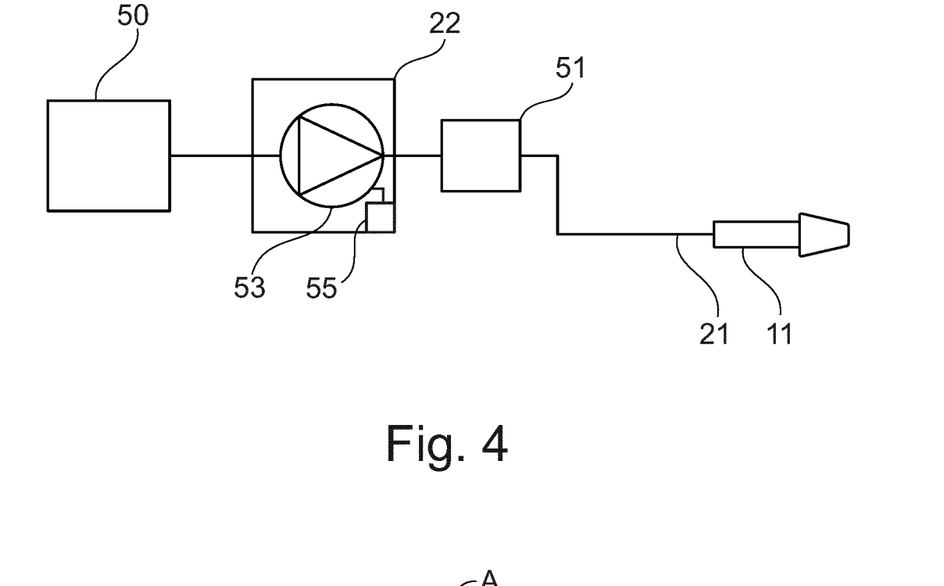
FIG. 4 is a simplified schematic representation of the hydraulic circuit of the cleaning station according to the invention.

One first end 33 of the swiveling axis 21 comprises a connector 35 for connecting the hollow swiveling axis 21 to a pump unit 22 (FIG. 4).

The other second end 37 of the swiveling axis 21 is connected to the second drive 15.

In the present case, the second drive 15 comprises an electrical motor 39 connected to and controlled by the controller unit 16. The electrical motor has an output shaft 41 which is connected by a belt 43 to a disk 45 fixed to the second end 37 of the swiveling axis 21.

The cleaning station 1 further comprises a separate drying nozzle 49 (FIGS. 1 and 5) which is also mounted on the second drive 15 and is configured to project, after cleaning, a drying jet 49A of a drying gas (for example filtered air) towards the optical element 3.

Figure 5:
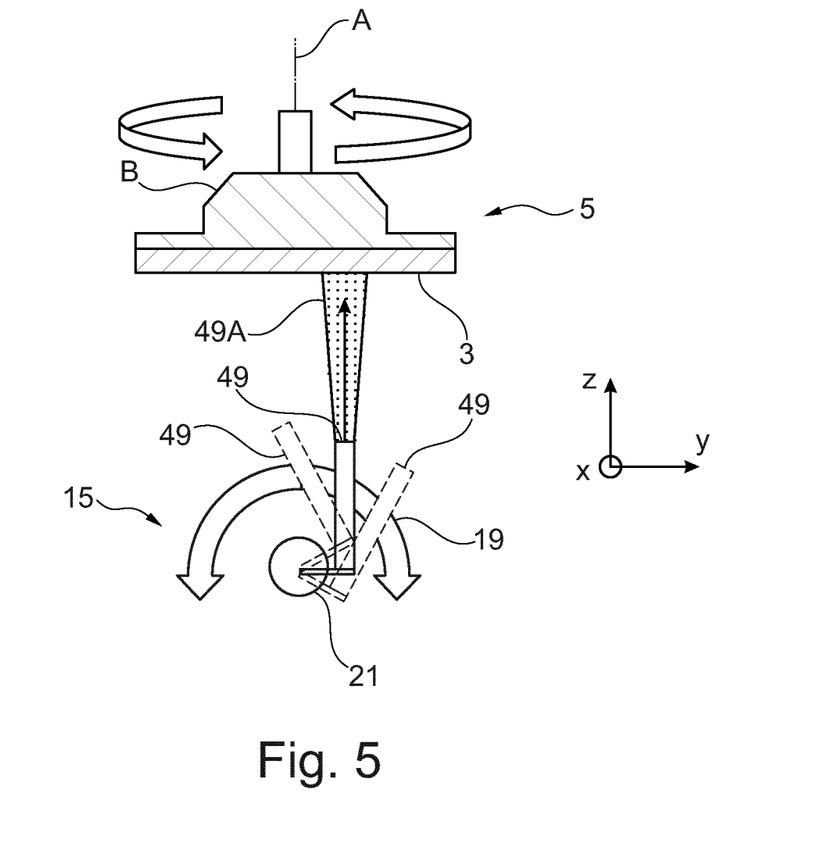
FIG. 5 is a simplified schematic representation in cross-section view of a part of the cleaning station showing in particular the drying nozzle.

The drying nozzle 49 is for example a tube allowing to limit divergence of the drying jet 49A and having an inner diameter of less than 1 mm to which can be applied pressurized drying gas of about 4-8 bars, in particular 5-6 bars. The pressurized gas is for example filtered air according to the international standard ISO 8573-1:2010 [7:8:4] for inert gases and containing particles of less than 40 μm.

The drying nozzle 49 is coupled and fixed to the cleaning nozzle 11, slightly offset with respect to the latter, and points in a direction parallel to said cleaning nozzle 11.

The second drive 15 is configured for moving the drying nozzle 49 in order that the drying jet 49A impacts successively different locations on the optical element 3 during drying operation.

As for the cleaning, the second drive 15 is configured to apply a swivel movement (arrows 19 on FIG. 5) to the drying nozzle 49.

In FIG. 5, a medium position of the drying nozzle 49 is drawn in solid lines whereas two extremal positions of the drying nozzle 49 are drawn in dashed lines.

Thus, thanks to the rotational movement of the optical element holder 5 and the back and forth swiveling movement of the drying nozzle 49, the drying jet 49A impacts successively all locations on the optical element 3 during drying operation, developing thus the best drying impact.

Thus, after cleaning operation, the optical element 3 can be dried efficiently due to its rotation on the optical element holder 5 and a drying jet 49A. The swivel movement of the drying nozzle 49 is in particular controlled in the same way as the cleaning nozzle 11 so that it moves only to the very circumference of the optical element 3 and does not exceed the circumference of the latter. In other words, the swivel movement is depending on the individual geometry of the optical element 3 and is adjusted automatically according to job data related to the optical element 3. The start or zero position of the drying nozzle 49 is off the center of the optical element 3 in order to avoid damage due to the high pressure drying jet 49A.

This feature increases the product yield rate because it avoids potential re-deposition of water droplets from the walls of the cleaning chamber 23. Indeed, if the drying jet exceeds the circumference of the optical element 3, it is likely to hit the wet walls of the cleaning chamber 23 and may recontaminate the optical element 3 with cleaning liquid.

The cleaning liquid of the cleaning jet 13 comprises deionized water (DI water) from a deionized water tank 50. A lens drying additive may be added to the deionized water. Such a lens drying additive may be of the family of alcohols.

The cleaning station 1 may further comprise a heater 51 installed downstream the pump unit 22 for heating the deionized water, in particular to a temperature comprised between 30° C. and 40° C., for example 35° C.

The pump unit 22 comprises a piston operated pump unit 53, in particular a pneumatic high pressure pump which is equipped with a stroke number monitoring unit 55. Such a stroke number monitoring unit 55 may comprise an induction loop to measure the displacements of the piston in the piston operated pump unit 53.

The working pressure and output of the piston operated pump unit for the cleaning jet is comprised between 150-200 bars, in particular about 180 bars.

The stroke rate of the piston operated pump unit 53 is for example comprised between 100 and 200 strokes/min, in particular 150 strokes/min.

The stroke number monitoring unit 55 counts the number of strokes of the piston operated pump unit 53 in order to detect potential clogging of the cleaning nozzle 11 which would lead to high product rejection rates. This feature is especially helpful when running a fully automated manufacturing of optical elements 3. Once the number of strokes is out of a defined range (for example +/− 15% of a reference value), the cleaning station 1 will stop processing and an operator will be prompted to maintain or change the cleaning nozzle 11.

One understands that the here disclosed cleaning station 1 allows a very efficient cleaning of optical elements 3 in order to prepare the surface of the optical element 3 to be hard coated.

As an example, the whole cleaning and drying cycle lasts only about 20-30 s.

The optical elements 3 may be auto-loaded in particular when the optical element holder 5 is equipped with clamping means for cooperation with clamping portion C of the block piece B.

Figure 6:
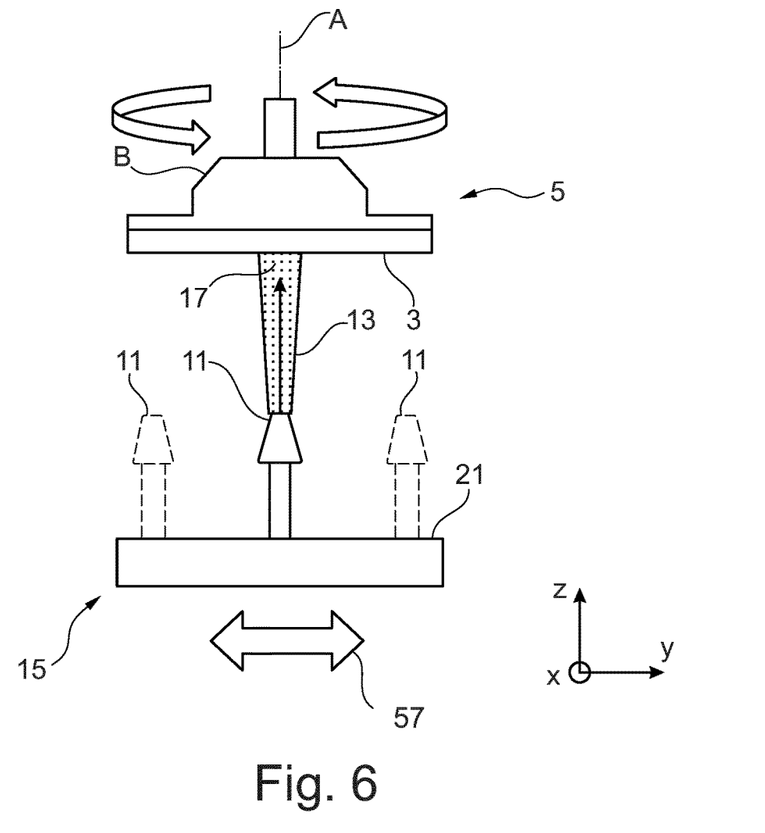
FIG. 6 is a simplified schematic representation similar to that of FIG. 3 of an alternative embodiment of the cleaning station according to the invention.

Alternatively to the swiveling drive 15 as disclosed above, the second drive 15 may also be configured to apply, as shown in FIG. 6, a translational movement (represented by doubled arrow 57) to the cleaning nozzle 11 that is perpendicular to the rotation axis "A" of the optical element holder 5.

In FIG. 6, a central position of the cleaning nozzle 11 is drawn in solid lines whereas two extremal positions of the cleaning nozzle 11 are drawn in dashed lines. In this embodiment, the second drive 15 may be a slider moving the cleaning nozzle 11 perpendicular to the rotation axis A of the optical element holder 5.

This alternative also applies to the drying nozzle 49 in the same way.

Thanks to the controlled movement of the cleaning jet 13 on the one side and the rotation of the optical element 3, the latter is cleaned very efficiently and due to subsequent drying, the second face cc of the optical element 3 is well prepared for further coating.

Figure 7:
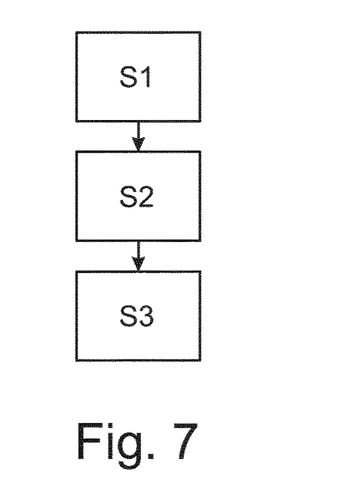
FIG. 7 is an example of a flowchart of a method for cleaning an optical element.

FIG. 7 depicts an example of a flowchart of a method for cleaning an optical element 3 using the above described cleaning station 1 and comprising the following steps.

In a first step S1, the optical element around 3 is rotated around its optical axis OA. Rotation is initiated before projection of the cleaning jet 13. In addition, the cleaning nozzle 11 is offset with respect to the center of the optical element 3. Thus, the projection of the cleaning jet 13 starts at a position different to the center of the rotation of the optical element 3 in order to prevent potentially damage to the optical element 3.

In a second step S2, a cleaning jet 13 of a cleaning liquid, for example at a pressure between 150-200 bars, in particular 180 bars, is projected towards the optical element 3 and the cleaning jet 13 carries out a swiveling or a translational movement in order that the cleaning jet 13 impacts successively all locations on the optical element 3.

Then in a third step S3, a drying jet 49A of a drying gas is projected toward the optical element 3, the drying jet 49A carrying out a swiveling or a translational movement in order that the drying jet 49A impacts successively all locations on the optical element 3.

During steps S2 and S3, the movement of the cleaning jet 13 and the drying jet 49A is respectively limited or restricted in order that the impact of the cleaning jet 13 and the drying jet 49A is located on the optical element 3. This enhances throughput of the cleaning station 1 and prevents during drying step S3 re-deposition of droplets onto the second face cc of the optical element 3.

Also during steps S2 and S3, aspiration is applied to the suction pipe 25 thank to exhaust fan 26.

LIST OF REFERENCES

SFB—Semi-finished lens blank
B—Block piece
cx—First face
cc—Second face
E—Edge
HC—Hard coating
AR—Anti-reflection coating
TC—Top coating
GC—Grip coating
HIL—High index anti-reflection layer
LIL—Low index anti-reflection layer
CB—Combination of SFB and B
M—Blocking material
C—Clamping portion
F—Workpiece mounting face
A—Rotation axis
OA—Optical axis
1—Cleaning station
3—Optical element
5—Optical element holder 7—Frist drive
9—Rotational guide
11—Cleaning nozzle
13—Cleaning jet
15—Second drive
16—Controller unit
17—Center of cleaning jet
19—Arrow for swivel movement
21—Swiveling axis
22—Pump unit
23—Cleaning chamber
25—Suction pipe
26—Exhaust fan
27—Bottom cylinder
29—Separable lid
31—Bearing
33—Frist end of swiveling axis
35—Connector
37—Second end of swiveling axis
39—Electrical motor of second drive
41—Output shaft
43—Belt
45—Disk
49—Drying nozzle
49A—Drying jet
50—Water tank
51—Heater
53—Piston operated pump unit
55—Stroke number monitoring unit
57—Arrow for translational movement
S1—First step of a method for cleaning an optical element
S2—Second step a method for cleaning an optical element
S3—Third step a method for cleaning an optical element

The invention claimed is:

1. A cleaning station for an optical element, comprising:
an optical element holder configured to hold the optical element;
a first drive configured to rotate the optical element holder around a rotation axis coinciding with an optical axis of the optical element when held by the optical element holder;
a cleaning nozzle configured to project a cleaning jet of a cleaning liquid towards the optical element; and
a separate drying nozzle configured to project a drying jet towards the optical element,
wherein the cleaning nozzle and the drying nozzle are configured to move in order to direct the cleaning jet and the drying jet, respectively, successively to different locations on the optical element,
wherein the cleaning station further comprises a piston operated pump unit having a stroke number monitoring unit configured to deliver a high pressure cleaning liquid to the cleaning nozzle, a pressure of the cleaning liquid being between 150-200 bars, the stroke number monitoring unit being configured to count the number of strokes of the piston operated pump unit and to stop processing of the cleaning station when the counted number of strokes is out of a defined range.

2. The cleaning station according to claim 1, wherein the cleaning nozzle and the drying nozzle are mounted on a second drive of the cleaning station, and wherein the second drive is configured to move the cleaning nozzle and the drying nozzle.

3. The cleaning station according to claim 2, wherein the second drive comprises a swiveling axis oriented perpendicular to a rotation axis of the optical element holder and configured to apply a swivel movement to the cleaning nozzle and the drying nozzle.

4. The cleaning station according to claim 2, wherein the second drive is configured to apply a translational movement to the cleaning nozzle and the drying nozzle that is perpendicular to a rotation axis of the optical element holder.

5. The cleaning station according to claim 1, further comprising a cleaning chamber housing the optical element holder, the cleaning nozzle, and the drying nozzle, and connected to a suction pipe.

6. The cleaning station according to claim 1, wherein the cleaning liquid comprises deionized water completed with a lens drying additive.

7. The cleaning station according to claim 6, further comprising a heater configured to heat the deionized water to a temperature between 30° C. and 40° C.

8. The cleaning station according to claim 1, wherein the defined range is defined as +/−15% of a reference value.

9. The cleaning station according to claim 1, wherein a stroke rate of the piston operated pump unit is between 100 strokes/min and 200 strokes/min.

10. The cleaning station according to claim 1, wherein the drying nozzle is coupled to the cleaning nozzle and points in a direction parallel to the cleaning nozzle.

11. The cleaning station according to claim 2, wherein the second drive is configured to limit an impact of the cleaning jet and the drying jet to be located on the optical element.

* * * * *